No. 894,948. PATENTED AUG. 4, 1908.
V. G. GUTHRIE.
SEED DISTRIBUTER.
APPLICATION FILED DEC. 14, 1906.

3 SHEETS—SHEET 1.

Witnesses
M. D. Blondel
E. B. McBath

Inventor
V. G. Guthrie.
By
Attorneys

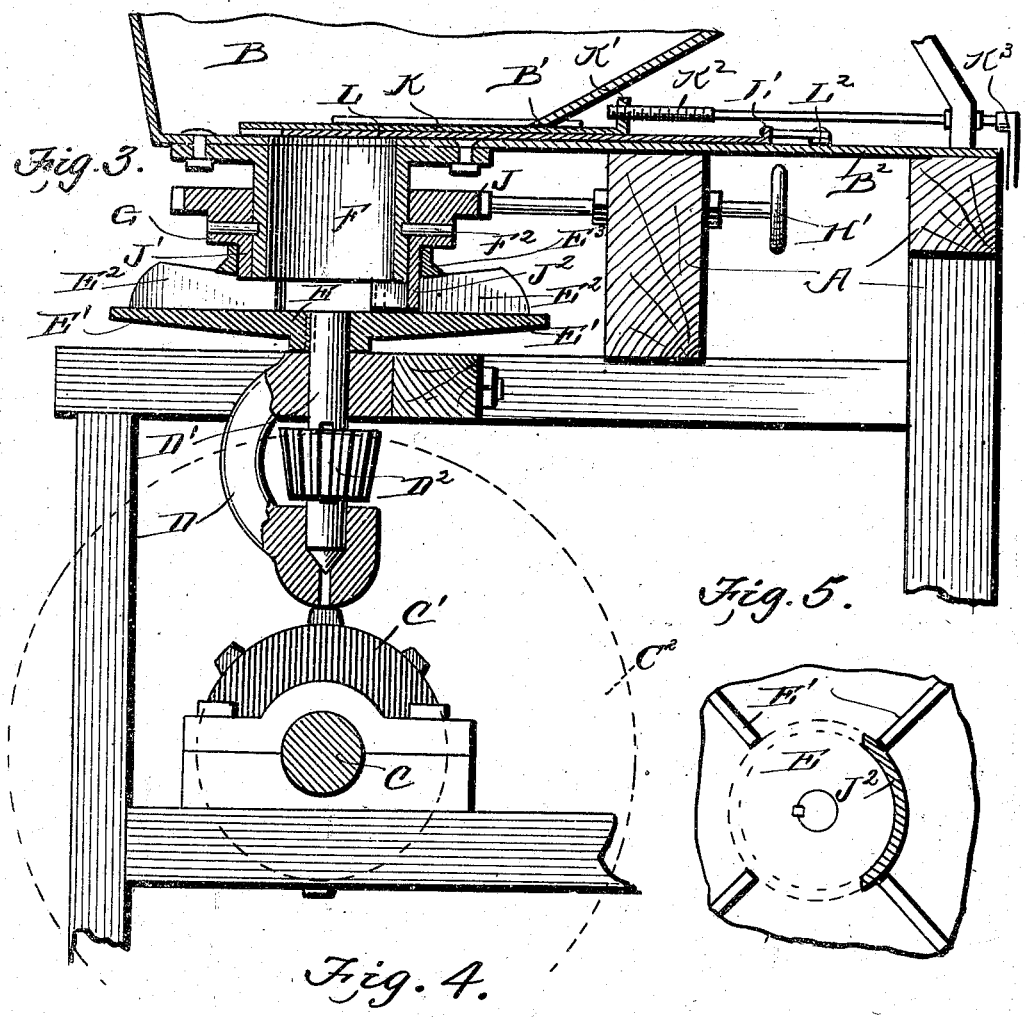
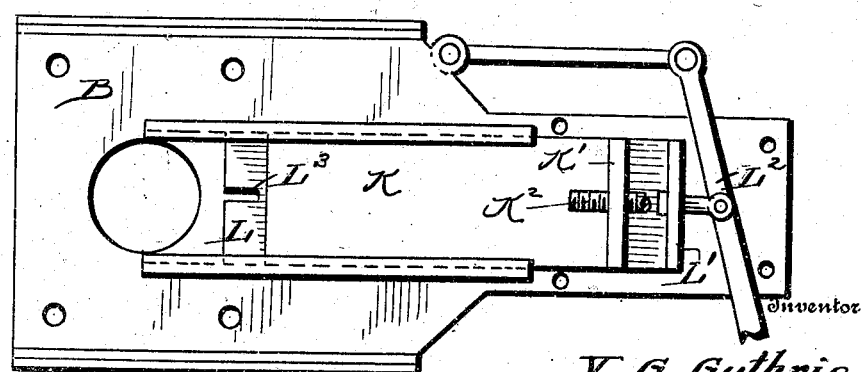

No. 894,948.

PATENTED AUG. 4, 1908.

V. G. GUTHRIE.
SEED DISTRIBUTER.
APPLICATION FILED DEC. 14, 1906.

3 SHEETS—SHEET 3.

Witnesses
Inventor
V. G. Guthrie,
By
Attorneys

UNITED STATES PATENT OFFICE.

VICTOR GLAUCUS GUTHRIE, OF WINTERS, CALIFORNIA.

SEED-DISTRIBUTER.

No. 894,948.     Specification of Letters Patent.     Patented Aug. 4, 1908.

Application filed December 14, 1906. Serial No. 347,853.

*To all whom it may concern:*

Be it known that I, VICTOR GLAUCUS GUTHRIE, a citizen of the United States, residing at Winters, in the county of Yolo and State of California, have invented a new and useful Improvement in Seed-Distributers, of which the following is a specification.

This invention relates to a seed distributer and the object of the invention is the sowing of the seed broad-cast and a further object of the invention is to direct the throw of the seed so that it will fall either directly to the rear and partially upon the sides or entirely upon one side of a movable vehicle.

The invention consists in a hopper, means for feeding the seed from said hopper to a rotatable disk provided with deflecting blades carried by wings formed on the disk, and an adjustable deflecting plate, coöperating with the disk and deflecting the seed to the proper blade.

Figures 1, 2:
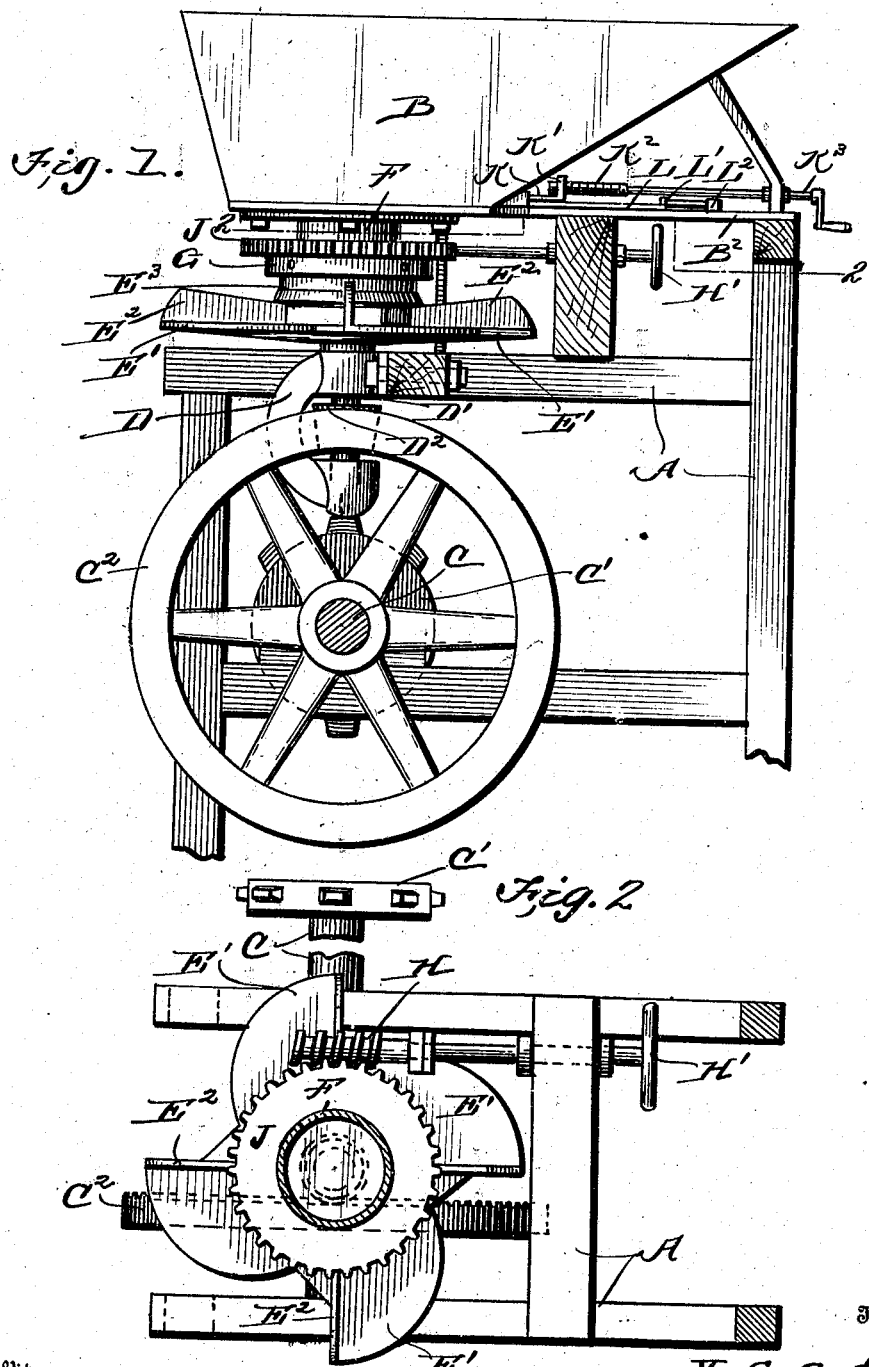
Figure 6:
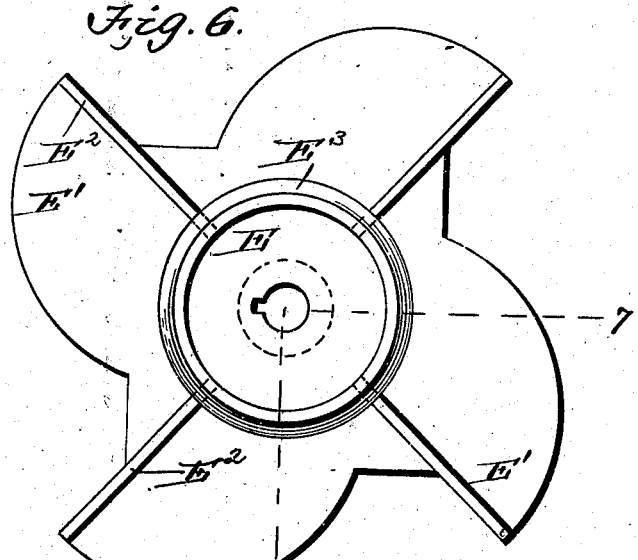
Figure 7:
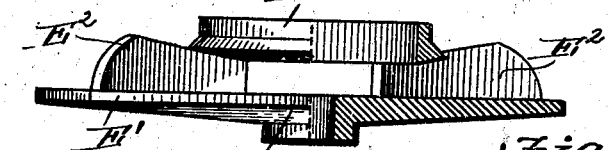
Figure 8:
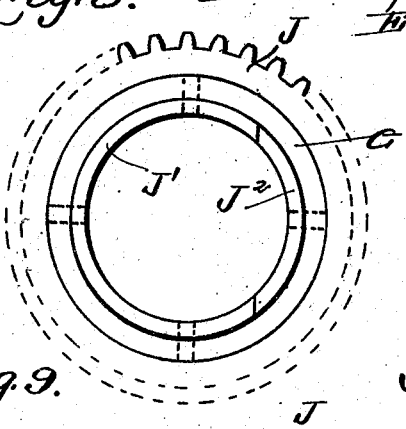
Figure 9:
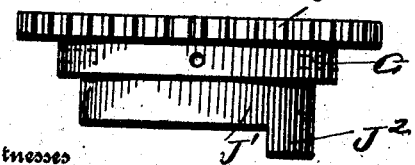
Figure 10:
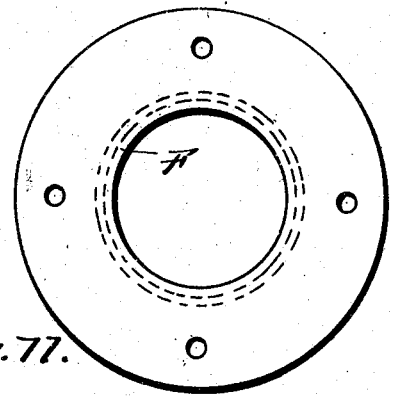
Figure 11:
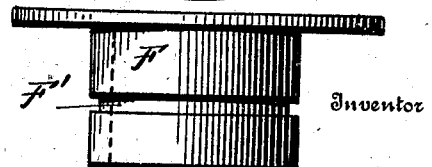

In the accompanying drawings, Figure 1 is a side elevation of the seed distributing mechanism, portions of a supporting frame being in section. Fig. 2 is a section on the line 2—2 of Fig. 1. Fig. 3 is a vertical section taken through the seed distributing mechanism, a part of a hopper being also shown in section. Fig. 4 is a plan view of the hopper bottom and valves controlling the flow of seed from said hopper. Fig. 5 is a plan view of the central portion of a distributing disk, a movable deflector plate being shown in section. Fig. 6 is a plan view of the disk detached. Fig. 7 is a section on the line 7—7 of Fig. 6. Fig. 8 is an inverted plan view of the deflector plate and a collar and gear formed integral with it, the gear wheel being partly indicated in dotted lines. Fig. 9 is a side view of the said plate, collar and gear wheel. Fig. 10 is a plan view of a flanged collar and Fig. 11 is a side view of said collar.

In these drawings A represents a supporting frame which may be carried by a vehicle of any kind and can be attached to the rear portion of an ordinary farm wagon. Mounted upon this frame is a hopper B, which is provided with a slot B' through which suitable slide valves to be hereafter described work. The bottom of the hopper B² is extended a considerable distance upon the slotted side of the hopper to form a support for these valves.

In the frame below the hopper is mounted a shaft C which carries a sprocket wheel C'. In use a chain, not shown, of the ordinary kind is run over this sprocket from a drive axle of the vehicle or driven in any other desired manner.

A cog wheel C², is mounted upon the shaft C, and in a bracket D is mounted vertically a shaft D' upon which is keyed a beveled pinion D² which meshes with the teeth of the cog wheel C².

Upon the upper end of the shaft D' is keyed a disk E, which is provided with wings E', and with radially extending deflector blades E² which are formed upon the disk and which are co-incident with the straight edges of the wings E'. These deflector blades are in the nature of ribs or shoulders and terminate at their inner ends short of the center of the disk and extend outwardly to the tip of the wings.

An annular shoulder E³ is carried by the inner ends of the blade E² and I prefer to cast the disk, wings, deflector blades and the said shoulder all in one piece. Upon the under side of the hopper B, which discharges downwardly, in the customary manner, is bolted a flanged cylindrical collar F, the outer face of which is provided with an annular groove F'.

A collar G fits rotatably upon the collar F, and pins F² carried by the collar G, have their inner ends resting in the groove F' and travel in said groove when the collar G is rotated upon the collar F. A collar G carries a gear wheel J, upon its upper edge and a depending flange J', upon its lower edge which flange is of less thickness than the collar and consequently is of a smaller exterior diameter. Upon one side the flange J' is extended downwardly forming a deflector plate J². When the parts are in position, the collar F rests concentric with the annular shoulder E³ and the collar G rests upon said shoulder and the flange J', rests between the said shoulder and the collar F, and the deflector plate J² extends downwardly to the disk E, and is of sufficient length to extend from the inner end of one of the deflector blades E² to an adjacent blade, thus entirely cutting off one of the wings E' from communication with the collar F into which the hopper discharges the seed.

Slide valves K and L are supported by the extension B² and work through the slot B'. The slide valve K rests upon and slides on the valve L. At their outer ends they are provided with flanges K' and L', respectively. A threaded rod K² works through the flange K' and is operated by a suitable handle or crank K³. The valve L is operated by a lever L² which is pivotally connected to the flange L'. The valve L, is notched at its inner end as shown at L³. A worm gear H is also supported by the frame A and meshes with the gear J and is operated by a hand wheel H'.

It will be obvious that the valve L is adapted for a quick movement and is used when it is desired to entirely cut off the flow of seed. Or when certain seed such as flax are to be sown the valve L is moved inwardly so as to barely rest across the feed opening the seed being fed through the notch L³. The flange K being adapted for a slow movement is employed to regulate the amount of seed fed from the hopper, the side L being thrown entirely open, and the flow of seed being regulated by proper adjustment of the slide K. As the seed falls through the collar F upon the revolving disk E it will be thrown outwardly by centrifugal force upon the wings E' and will be sown broadcast by coming into contact with the deflector blades carried by said wings.

The deflector plate J² can be shifted by means of the hand wheel H', worm gear H and gear wheel J into any desired position and will direct the feed of the seed to the proper wings.

In the position shown in the drawings, the deflector plate J² is in position to prevent the seed from being thrown toward the vehicle and by shifting it ninety degrees in either direction, the seed can be cut off from either side and thrown to the rear and upon the opposite side. By this means, for example, when the vehicle was driven adjacent a line fence the throw of the seed toward the fence could be prevented.

Having thus fully described my invention, what I claim as new and desire to secure by Letters Patent, is:—

1. In a seed distributer, a winged disk, deflector blades co-incident with the edges of the wings, said blades terminating short of the disk center, an annular shoulder carried by said blades and connecting their inner portions, a collar resting on said shoulder and having a flange fitting within the shoulder, and a deflector plate carried by said flange and extending from one deflector blade to another.

2. A device of the kind described comprising a disk having wings, radial deflector blades formed on said disk and extending outwardly upon the wings and terminating short of the center of the disk, a movable deflector plate adapted to connect the inner ends of two of the deflector blades, and means for simultaneously feeding seed to the disk and rotating the disk.

3. A device of the kind described comprising a rotatable winged disk, deflector blades formed radially upon the disk each blade being co-incident with a straight edge of one of the wings and terminating short of the center of the disk, means for feeding seed to the disk, means for rotating the disk and a normally stationary collar supported immediately above the disk and having a flanged extension connecting the inner ends of the deflector blades as and for the purpose set forth.

4. In a device of the kind described a rotatable winged disk receiving seed from a suitable source of supply, and discharging the same by centrifugal action, and adjustable means coöperating with the disk and directing the throw of the seed to the desired portion of the disk.

5. A device of the kind described comprising a rotatable vertical shaft, a disk keyed thereon, radial deflector blades carried by the disk and stopping short of the center of the disk, an annular shoulder carried by the inner portions of the said blades, a hopper, a feed collar carried by the hopper and having its lower end concentric with said shoulder, a collar adapted to rotate about the first mentioned collar and having a flange resting between the said collar and shoulder, said flange having an extension extending downwardly to the disk and connecting the inner end of two adjacent deflector blades.

6. A device of the kind described comprising a frame, the hopper carried thereby, a driven shaft carried by said frame below the hopper, a vertical shaft between the hopper and first mentioned shaft, a cog wheel mounted on the first mentioned shaft, a beveled pinion mounted upon the vertical shaft and meshing with the cog wheel, a disk keyed upon the upper end of the vertical shaft, and deflector blades carried by said disk, seed discharged from the hopper falling upon said disk.

7. In a seed distributer a hopper, valves regulating the flow of seed from said hopper, one of said valves having a quick motion and the other having a slow motion, a rotatable disk arranged below the hopper and receiving seed therefrom, deflector blades carried by the disk and stopping short of the center of the disk, a collar rotatably supported by the hopper, a gear wheel carried by the collar, a deflector plate carried by the collar, said plate extending from the inner end of one deflector blade to an adjacent blade, and a worm gear meshing with the said gear wheel as and for the purpose set forth.

8. In a seed distributer, a hopper, a disk provided with wings and deflector blades receiving seed from the hopper, said deflector blades terminating short of the center of the disk, a collar rotatably supported by the hopper, a gear wheel carried by said collar, a depending flange carried by the collar, an annular shoulder formed on the central part of the disk, said shoulder resting upon the inner portions of the deflector blades, the said collar resting upon said shoulder, the depending flange resting within the shoulder, and a deflector plate extending downwardly from said flange, said plate resting upon the disk and extending from the inner end of one deflector blade to the inner end of the other, and means for rotating said gear.

VICTOR GLAUCUS GUTHRIE.

Witnesses:
JAMES M. CLUM,
J. A. HENDERSON.